(12) United States Patent
Dunne

(10) Patent No.: US 10,146,103 B2
(45) Date of Patent: Dec. 4, 2018

(54) CAMERA MODULE AND FOLDED OPTICAL SYSTEM FOR LASER-BASED SPEED GUN

(71) Applicants: Laser Technology, Inc., Centennial, CO (US); Kama-Tech (Hk) Limited, Hong Kong (CN)

(72) Inventor: Jeremy G. Dunne, Parker, CO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 0 days.

(21) Appl. No.: 15/473,307

(22) Filed: Mar. 29, 2017

(65) Prior Publication Data

US 2017/0285444 A1    Oct. 5, 2017

Related U.S. Application Data

(60) Provisional application No. 62/316,319, filed on Mar. 31, 2016.

(51) Int. Cl.
| | |
|---|---|
| *G03B 13/08* | (2006.01) |
| *G01S 17/02* | (2006.01) |
| *G01S 17/58* | (2006.01) |
| *G02B 17/00* | (2006.01) |
| *G03B 13/36* | (2006.01) |
| *G01S 13/92* | (2006.01) |
| *G03B 17/17* | (2006.01) |
| *G03B 17/48* | (2006.01) |

(Continued)

(52) U.S. Cl.
CPC .............. *G03B 13/08* (2013.01); *G01S 13/92* (2013.01); *G01S 17/023* (2013.01); *G01S 17/58* (2013.01); *G02B 17/008* (2013.01); *G03B 13/36* (2013.01); *G03B 17/17* (2013.01); *G03B 17/48* (2013.01); *G08G 1/054* (2013.01); *H04N 5/2252* (2013.01); *H04N 5/2254* (2013.01)

(58) Field of Classification Search
CPC ....... G03B 13/08; G03B 13/36; G01S 17/023; G01S 17/58; G02B 17/008
USPC .......................................................... 396/386
See application file for complete search history.

(56) References Cited

U.S. PATENT DOCUMENTS

| | | | | |
|---|---|---|---|---|
| 5,717,195 A | * | 2/1998 | Feng .................... | G06K 7/1093 235/462.09 |
| 6,636,701 B1 | * | 10/2003 | Vezard .................... | G01J 1/429 250/372 |

(Continued)

FOREIGN PATENT DOCUMENTS

EP    0680027    11/1995

OTHER PUBLICATIONS

Anonymous, "Raspberry Pi," Mar. 10, 2016, Retrieved from the Internet: https://web.archive.org/web/20160310192010/http://www.truetex.com/raspberrypi.

(Continued)

*Primary Examiner* — Clayton E Laballe
*Assistant Examiner* — Linda B Smith
(74) *Attorney, Agent, or Firm* — William J. Kubida; Hogan Lovells US LLP

(57) ABSTRACT

A laser-based speed gun includes a camera module and a folded optical system including an objective lens and an eyepiece lens. The folded optical system includes first and second image redirecting elements for redirecting an image pathway from the objective lens to the eyepiece lens adjacent the camera module.

2 Claims, 3 Drawing Sheets

(51) Int. Cl.
*G08G 1/054* (2006.01)
*H04N 5/225* (2006.01)

(56) References Cited

U.S. PATENT DOCUMENTS

| | | | | |
|---|---|---|---|---|
| 6,696,978 | B2* | 2/2004 | Trajkovic | G08G 1/0175 |
| | | | | 340/933 |
| 7,133,608 | B1* | 11/2006 | Nagata | G03B 13/02 |
| | | | | 348/333.09 |
| 7,708,205 | B2* | 5/2010 | Kotlarsky | G06F 9/44526 |
| | | | | 235/462.15 |
| 7,898,745 | B2* | 3/2011 | Matsui | G03B 17/17 |
| | | | | 359/678 |
| 7,920,251 | B2 | 4/2011 | Chung | |
| 8,311,343 | B2 | 11/2012 | Chung | |
| 8,446,467 | B2* | 5/2013 | Tilton | G08G 1/054 |
| | | | | 340/933 |
| 9,247,215 | B1* | 1/2016 | Athan | G01C 3/06 |
| 2002/0136150 | A1* | 9/2002 | Mihara | G02B 15/173 |
| | | | | 369/125 |
| 2004/0062533 | A1* | 4/2004 | Koike | G03B 19/04 |
| | | | | 396/6 |
| 2005/0088562 | A1* | 4/2005 | Noto | G02B 5/04 |
| | | | | 348/335 |
| 2009/0091821 | A1* | 4/2009 | Regan | G02B 5/208 |
| | | | | 359/351 |
| 2009/0128934 | A1* | 5/2009 | Plangger | G02B 21/362 |
| | | | | 359/827 |
| 2014/0063261 | A1 | 3/2014 | Betensky et al. | |
| 2014/0362231 | A1 | 12/2014 | Bietsch et al. | |
| 2016/0044250 | A1 | 2/2016 | Shabtay et al. | |

OTHER PUBLICATIONS

Anonymous, "960H varifocal Low Illumination HD Usb Camera USB2.0 AR0130 Sensor with IR Cut and 2.8-12 Lens," Mar. 5, 2016, Retrieved from the Internet: URL: https://web.archive.org/web/20160305064319/http://www.elpcctv.com:80/960h-varifocal-low-illumination-hd-usb-camera-usb20-a-r0130-sensor-with-ir-cut-and-2812-lens-p-2-11.html.

Extended European Search Report dated Aug. 22, 2017 in corresponding EP Patent Application No. EP 17164273.9.

* cited by examiner

CAMERA MODULE AND FOLDED OPTICAL SYSTEM FOR LASER-BASED SPEED GUN

RELATED APPLICATIONS

The present application relates to and claims priority of U.S. provisional patent application Ser. No. 62/316,319, filed on Mar. 31, 2016. The disclosure of the Provisional application is hereby incorporated by reference in its entirety.

BACKGROUND OF THE INVENTION

The present invention relates, in general, to the field of speed measurement devices capable enabling the identification of particular vehicles in recorded images. More particularly, the present invention relates to a camera module and folded optical system for laser-based speed guns.

Laser Technology, Inc. assignee of the present invention, has introduced the TruCAM® (a registered trademark of Laser Technology, Inc.) video laser device which is the industry's first all-in-one laser-based video camera. In operation it collects and stores a complete chain of video evidence for both speeding and tailgating violations along with a high-resolution image that identifies the vehicle make, model and license plate number.

Representative of the technology embodied in the TruCAM devices is disclosed, for example, in U.S. Pat. No. 7,920,251 issuing Apr. 5, 2011 for: "Integrated Still Image, Motion Video and Speed Measurement System" and U.S. Pat. No. 8,311,343 issuing Nov. 13, 2013 for: "Vehicle Classification by Image Processing with Laser Range Finder" the disclosures of which are herein specifically incorporated by this reference in their entirety.

SUMMARY OF THE INVENTION

Disclosed herein is a camera module and folded optical system for a laser-based speed gun which may be conveniently implemented with a commercially available cell phone camera module. Such camera modules exhibit good image quality with built-in autofocus mechanisms at relatively low cost. However, they also have a very short focal length which would preclude them from use in zooming in on a vehicle license plate at a distance of 100 meters or so when implemented in a laser-based or other speed measurement instrument.

In order to fit within the dimensions of a handheld laser-based speed gun, a folded optical system is disclosed herein in conjunction with the camera module that effectively extends the focal length of the camera module by a factor of 12.5 thereby enabling it to discern a vehicle license plate out to a range of 100 meters or more.

Particularly disclosed herein is a laser-based speed gun which comprises a camera module and a folded optical system comprising an objective lens and an eyepiece lens. The folded optical system includes first and second image redirecting elements for redirecting an image pathway from the objective lens to the eyepiece lens adjacent the camera module.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
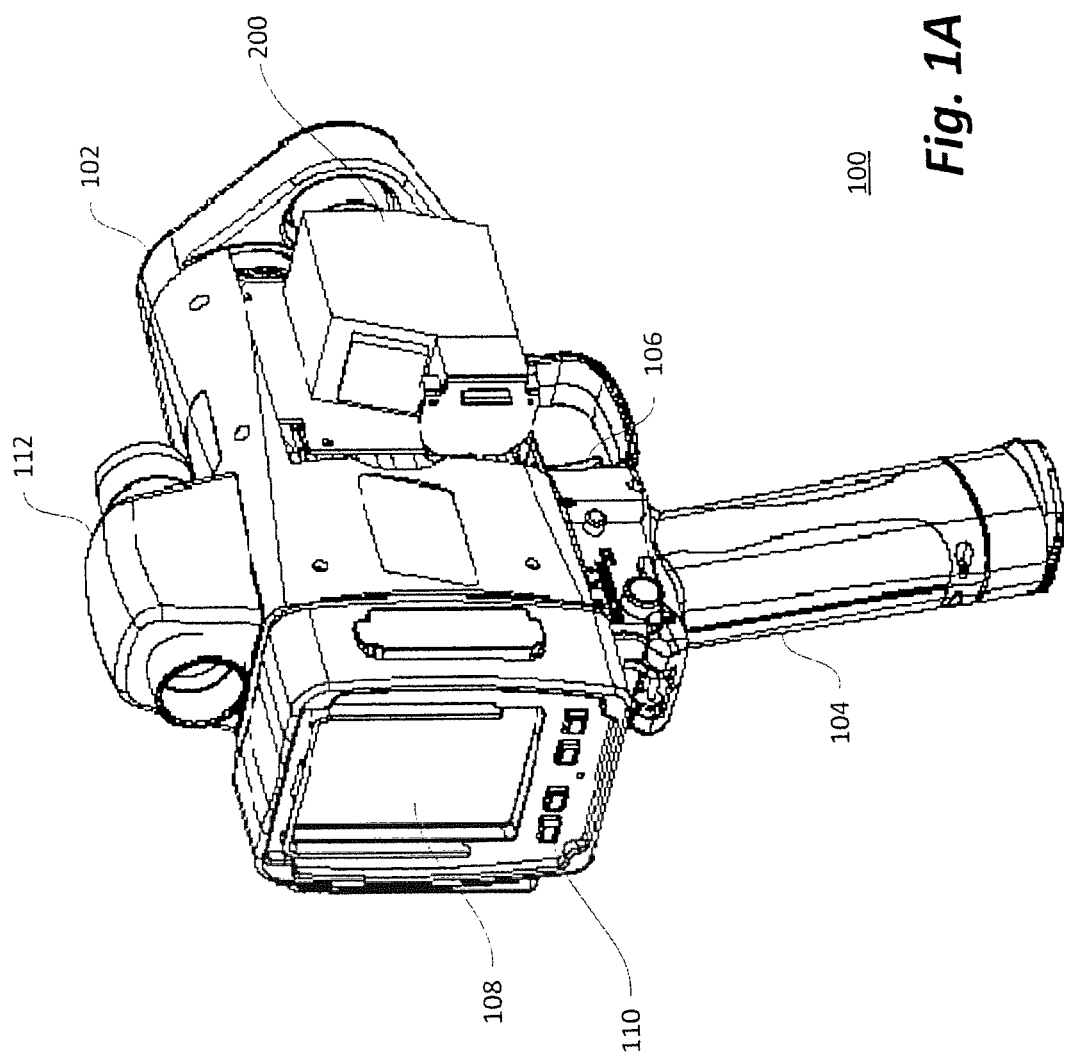
FIG. 1A is an isometric view of a representative laser-based speed gun incorporating the camera module and folded optical system of the present invention.

With reference now to FIG. 1A, an isometric view of a representative laser-based speed gun 100 is shown incorporating the camera module and folded optical system 200 of the present invention. The laser-based speed gun 100 comprises a housing 102 and associated handle 104 for handheld operation. A trigger 106 is provided to initiate the transmission and reception of laser pulses toward a moving object, such as a vehicle, as well as initiate the recording of video of the object in conjunction with the camera module and folded optical system 200. The laser-based speed gun 100, as illustrated, includes a display 108, user input and selection elements 110 as well as target vehicle sighting optics 112.

Figure 1B:
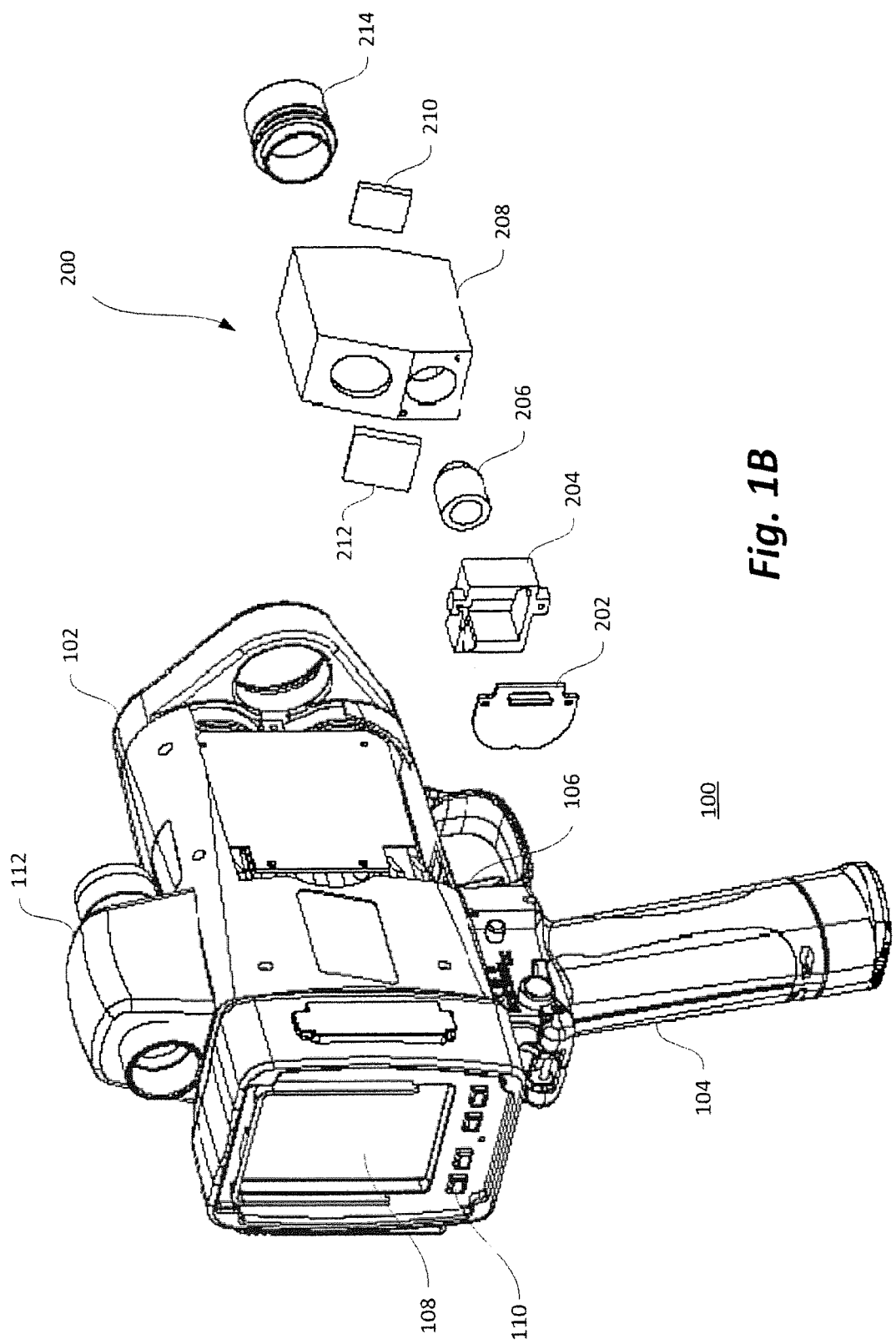
FIG. 1B is a comparable isometric view of the representative laser-based speed gun of the preceding figure illustrating an exploded view of the camera module and folded optical system.

With reference additionally now to FIG. 1B, a comparable isometric view of the representative laser-based speed gun 100 of the preceding figure is shown further illustrating an exploded view of the camera module and folded optical system 200. With respect to this figure, like structure to that previously described with respect to the foregoing figure is like numbered and foregoing description thereof shall suffice herefor.

The exemplary camera module and folded optical system 200 of the present invention comprises an autofocus camera module 202 such as might be employed in cellular telephones. As an example the camera module 202 may advantageously be provided as an e-CAM52A_ MI5640_MOD 5 mega pixel MIPI camera module available from e-con Systems, St. Louis, Mo. The camera module 202 is affixed to a spacer block 204 to set the proper spacing between the camera module 202 and the eyepiece lens 206. A housing 208 secures the eyepiece lens 206, first and second image redirection elements in the form of mirrors 210, 212 and objective lens 214.

Figure 2:
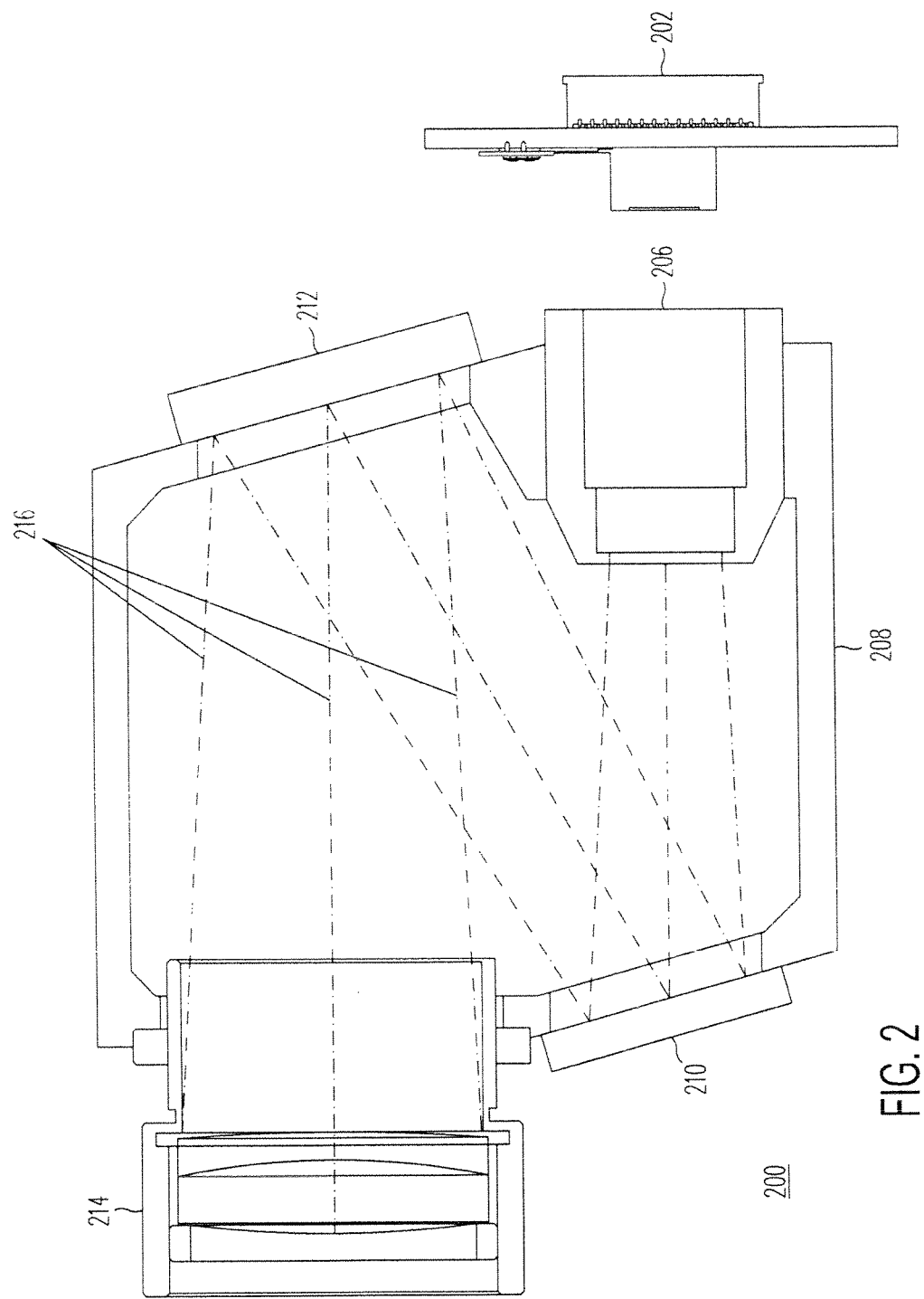
FIG. 2 is a cross-sectional, side elevational view of the representative embodiment of the camera module and folded optical system of the preceding figures illustrative of the image pathway between the objective lens and eyepiece lens adjacent the camera module.

With reference additionally now to FIG. 2, a cross-sectional, side elevational view of the representative embodiment of the camera module and folded optical system 200 of the preceding figures is shown illustrative of the image pathway 216 between the objective lens 214 and eyepiece lens 206 adjacent the camera module 202. As can be seen the image pathway 216 viewed through the objective lens 214 is redirected by the mirrors 212 and 210 toward the eyepiece lens 206 to be focused at its exit pupil upon the front lens of the camera module 202. The spacer block 204 is not shown in this figure. In operation, the camera module 202 itself can be appropriately positioned or the image electronically reversed as may be required.

Conventional cell phone camera modules provide good image quality with a built-in autofocus mechanism but exhibit a very short focal length. This short focal length means it is itself incapable of being able to zoom in on a license plate up to on the order of 100 meters or so away. In a representative embodiment of the camera module and folded optical system 200 of the present invention, the objective lens 214 may be substantially 150 mm while the eyepiece lens 206 is substantially 12 mm. This configuration provides an extension of the focal length by a factor of 150 mm/12 mm=12.5 thereby enabling the camera module 202 to identify a license plate out to 100 meters or more.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

The invention claimed is:

1. A laser-based speed gun system comprising:
a hand holdable housing comprising sighting optics for viewing a target vehicle;
a processor coupled to laser signal transmission and reception circuitry within said housing for directing laser ranging signals toward, and receiving reflected signals from said target vehicle, said processor operative for storing a sequence of ranges to said target vehicle in a range data queue;
a speed determiner module coupled to said processor and said range data queue for determining a speed of said target vehicle at selected ones of said sequence of ranges;
a camera module associated with said housing and coupled to said processor for recording a sequence of images of said target vehicle over said sequence of ranges and operative for storing said sequence of images in an image data queue;
an image processing module coupled to said processor and said image data queue, said laser speed-gun system operative for storing an image record of said target vehicle speed associated with a corresponding one of at least a subset of said sequence of images; and
a folded optical system comprising an objective lens and an eyepiece lens, having first and second image redirecting elements for redirecting an image pathway from said objective lens to said eyepiece lens adjacent said camera module, wherein said objective lens has a focal length of substantially 150 mm and said eyepiece lens has a focal length of substantially 12 mm.

2. A laser-based speed gun system comprising:
a hand holdable housing comprising sighting optics for viewing a target vehicle;
a processor coupled to laser signal transmission and reception circuitry within said housing for directing laser ranging signals toward, and receiving reflected signals from said target vehicle, said processor operative for storing a sequence of ranges to said target vehicle in a range data queue;
a speed determiner module coupled to said processor and said range data queue for determining a speed of said target vehicle at selected ones of said sequence of ranges;
a camera module associated with said housing and coupled to said processor for recording a sequence of images of said target vehicle over said sequence of ranges and operative for storing said sequence of images in an image data queue;
an image processing module coupled to said processor and said image data queue, said laser speed-gun system operative for storing an image record of said target vehicle speed associated with a corresponding one of at least a subset of said sequence of images; and
a folded optical system comprising an objective lens and an eyepiece lens, having first and second image redirecting elements for redirecting an image pathway from said objective lens to said eyepiece lens adjacent said camera module, said speed gun system further comprising a spacer block interposed between said eyepiece lens and said camera module.

* * * * *